United States Patent [19]

Abel et al.

[11] Patent Number: 4,665,362

[45] Date of Patent: May 12, 1987

[54] MAGNETIC-TYPE OF ANALOG DISTANCE SENSOR HAVING A HALL EFFECT SENSING ELEMENT

[75] Inventors: Joachim Abel, Hanover; Detlev Neuhaus, Langenhagen; Karl-Heinz Hesse, Gehrden; Michael Müller; Wolfgang Lichtenberg, both of Hannover, all of Fed. Rep. of Germany

[73] Assignee: WABCO Westinghouse Fahrzeugbremsen GmbH, Hannover, Fed. Rep. of Germany

[21] Appl. No.: 706,204

[22] Filed: Feb. 27, 1985

[30] Foreign Application Priority Data

Mar. 23, 1984 [DE] Fed. Rep. of Germany ....... 3410736

[51] Int. Cl.[4] .......................... G01B 7/14; G01B 7/30; G01R 33/06
[52] U.S. Cl. .................................. 324/208; 324/235; 324/251
[58] Field of Search ............... 324/207, 208, 235, 251; 338/32 R, 32 H; 336/130, 134; 340/870.31, 870.32, 870.33; 318/647, 653

[56] References Cited

U.S. PATENT DOCUMENTS

| | | | |
|---|---|---|---|
| 1,810,539 | 6/1931 | Sokoloff | 338/32 R X |
| 2,987,669 | 6/1961 | Kallmann | 324/251 |
| 3,112,464 | 11/1963 | Ratajski et al. | 338/32 H |
| 3,195,043 | 7/1965 | Burig et al. | 324/235 |
| 3,513,408 | 5/1970 | McGee | 336/130 X |
| 3,777,273 | 12/1973 | Baba et al. | 324/208 X |
| 3,835,373 | 9/1974 | Matula | 324/208 |
| 4,293,837 | 10/1981 | Jaffe et al. | 338/32 H |
| 4,406,999 | 9/1983 | Ward | 324/208 X |

FOREIGN PATENT DOCUMENTS 949593 2/1964 United Kingdom ............... 324/208

Primary Examiner—Gerard R. Strecker
Attorney, Agent, or Firm—J. B. Sotak

[57] ABSTRACT

The invention relates to an analog non-contact distance sensor which includes a fixed stationary annular magnetized armature. The stationary armature member is provided with an air gap into which is disposed an element which is sensitive to a magnetic field. The moving portion is a rod-shaped magnetic core member which can be inserted into the annular armature member. Depending on the depth of insertion of the core member, the amount of diversion of the magnetic field from the air gap of the armature is controlled. Consequently, the magnetic sensing element emits an electrical signal which corresponds to the distance travelled by the movable core member.

10 Claims, 2 Drawing Figures

1

MAGNETIC-TYPE OF ANALOG DISTANCE SENSOR HAVING A HALL EFFECT SENSING ELEMENT

FIELD OF THE INVENTION

The invention relates to an analog distance sensor and, more particularly, to a displacement measuring device employing a permanent magnet annular armature having an air gap accommodating a magnetic field sensing element and a movable rod-shaped core member disposed in the annular armature for varying the lines of flux passing through a sensing element in accordance with the position of the core member in relation to the annular armature.

BACKGROUND OF THE INVENTION

It will be appreciated that previous distance sensors have been manufactured in many versions or configurations and have been based on different operating principles. For example, one known type of sensing device is shown and described in German published Patent Application DE-OS No. 16 73 938. In this previously known sensing device, there is provided a rectangular iron yoke having two air gaps. In the one air gap, there is situated an element sensitive to a magnetic field. A regulating member is inserted in the other air gap. Depending on how far the regulating member is inserted into the other air gap, the magnetic flux emanating from the permanent magnet and passing through the yoke is varied. The variation in flux is recognized by the sensing element and the magnetic field is transformed into an electrical voltage which is a function of the distance that the member is inserted into the air gap.

One disadvantage of this previous arrangement is that it takes up a relatively large amount of space. In addition, only short distances can be sensed and measured.

OBJECTS AND SUMMARY OF THE INVENTION

Accordingly, it is an object of the invention to provide a unique distance sensor which may be installed in a cylindrical housing which takes up very little space and is also suitable for the measurement of relatively long distances.

Another object of this invention is to provide an analog distance sensor comprising, a stationary annular magnetic armature member, the annular magnetic armature member having an air gap, a sensing element which is sensitive to a magnetic field is disposed in the air gap, and a movable rod-shaped core member cooperatively associated with the armature member for varying the magnetic field in accordance with the distance the movable rod-shaped core member is moved relative to the stationary annular magnetic armature member.

BRIEF DESCRIPTION OF THE DRAWINGS

The above-noted objects and other attendant features and advantages of this invention will become more readily apparent by reference to the following description taken in conjunction with the accompanying drawings, in which.

DETAILED DESCRIPTION OF THE INVENTION

Figure 1:
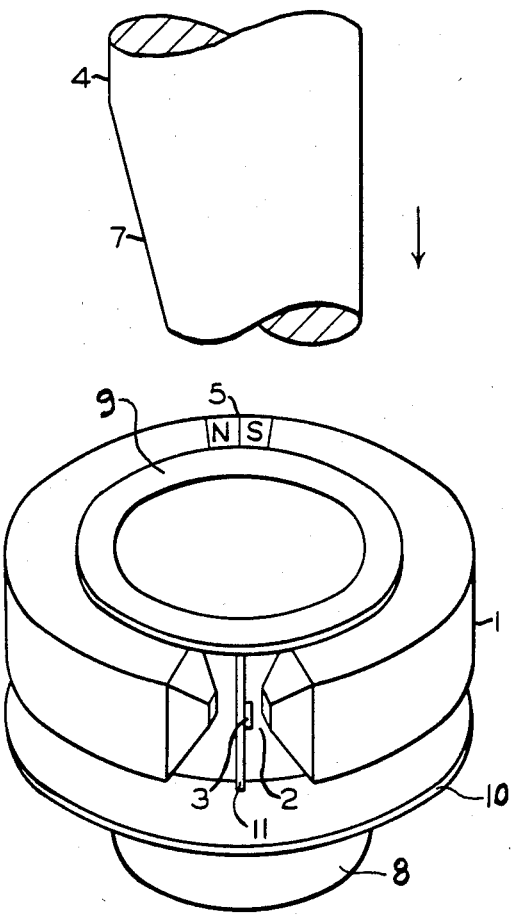
FIG. 1 is an elevational view of a linear distance sensor in accordance with the invention.

Referring now to the drawings, and in particular to FIG. 1, there is shown a magnetic-type of analog distance sensing device. The distance sensor includes a stationary annular magnetic core or armature member 1 which is mounted around a tubular member 8 having an upper rim 9. A washer-like plate 10 is slipped over the lower end of tubular member 8 to form a lower rim so that the armature member 1 is supported between the upper rim 9 and lower plate 10. The ring-shaped armature 1 is provided with an air gap 2 into which is disposed a sensing member or element 3. The sensing element 3 is suitably mounted on a plate member 11 which is located between the rim 9 and the plate 10. It will be seen that the terminal ends of the annular core 1 are pyramidically-shaped and have flat terminus portions having a surface area substantially equal to the surface area of magnetic sensing element 3. The tapered configuration of the ends of the core 1 in the air gap 2 concentrates the lines of flux through the magnetic sensing element 3. The element 3 is sensitive to a change in magnetic field strength in the air gap 2. The element 3, which is sensitive to a magnetic field, can take the form of either a Hall effect sensor or a variable reluctance member which produces a voltage that is proportional to the strength of the magnetic field. The entire annular core of the armature 1 may be a permanent magnet or a separate permanent magnet 5 may be interposed in the annular core of the armature 1.

The movable portion of the distance or displacement sensor takes the form of bar or rod-shaped iron core 4. The movable rod 4 is adapted to be inserted into the fixed annular armature 1. The rod-shaped core 4 has a conical tip on the front end 7. The magnetic flux in armature 1 may be varied dependent upon how far the core 4 is inserted into the armature 1. The flux density is measured by the sensing element 3 which is sensitive to the strength of the magnetic field. The sensor 3 converts the flux density into a voltage which is dependent and a function of the distance that the rod 4 is moved into the core 1.

It will be appreciated that the operation of the sensor described in this invention significantly differs from the prior art devices. In the non-inserted state of the core 4, which can be moved axially in relation to the armature 1, the major part of the magnetic flux goes through the armature 1 and through the element 3 sensitive to the magnetic field. Now, in the fully-inserted state of the core 4, however, a large part of the magnetic flux is short-circuited or shunted through the core 4 so that only a very small portion of the total magnetic flux still goes through the element 3 which is sensitive to the magnetic flux.

In order to ensure correct operation of the analog distance sensor, it is advisable to concentrically guide the core 4 in relation to the bore of the annular armature 1. Thus, in the fully-inserted state, then, there is a uniform annular air gap between the outer peripheral surface of the core 4 and the inner peripheral surface of the bore of the armature 1. It has been found from testing that a slight lateral displacement of the core 4 in relation to the armature 1, however, is not critical since the magnetic reluctance for the short-circuited magnetic flux is not significantly changed or varied.

According to a first embodiment of the invention, the core member 4 is provided with a tapered or flat surface 7. This means that the cross-section of the magnetic core 4 is entirely uniform and circular, and the amount of short-circuited or shunted magnetic flux is a function of the position of the surface 7 in relation to the apertured armature 1. By means of the surface 7, therefore, it is possible to adjust the sensitivity of the sensor by a slight rotation of the core 4. After such an adjustment, the core 4 is then fixed in the radial direction, and it can then be moved only in the axial direction to measure the distance of insertion into the armature 1.

Figure 2:
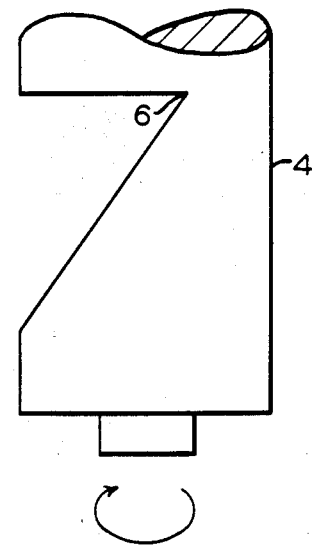
FIG. 2 is an elevational view of a special configuration of a movable rod-shaped core which is adapted to be used as a rotational direction sensor.

According to a second embodiment of the invention, as shown in FIG. 2, the core 4 is provided with a wedge-shaped cut-out or triangular recess 6. In this embodiment, the core member 4 is axially positioned and adjusted on the inside of the annular armature 1 and then fixed in the axial direction. By turning the core 4 in relation to the armature 1, the above-mentioned magnetic short-circuiting can then be changed. Thus, a rotational or angular distance sensor can be realized in FIG. 2.

It will be appreciated that the distance sensor described above may be advantageously installed in a cylindrical housing in a manner which takes up very little space. The sensor may be economically manufactured, and it causes little interference since the moving portion contains no active structural elements or hardware. The sensor is well suited for direct control, even in environments which have a high impact acceleration and a large stroke. For example, it can be used in a level control system for motor vehicles.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above-specifically-described embodiment of the invention may be made by those skilled in the art without departing from the spirit and scope of the invention as set forth in the appended claims.

Having thus described our invention, what we claim as new and desire to secure by Letters Patent is:

1. An analog distance sensor comprising, a tubular support member having a central annular bore and upper and lower rims, a stationary annular magnetic field generating armature member surrounding said tubular member between said upper and lower rims, said stationary annular magnetic field generating armature member having an air gap providing said armature member with spaced terminal ends, wherein lines of magnetic flux pass through said air gap between said terminal ends, a sensing element which is sensitive to a magnetic field mounted between said rim in said air gap, the terminal ends of said armature member being pyramidically-shaped and having flat terminus portions which have a surface area substantially equal to the surface area of said sensing element for concentrating the lines of magnetic flux through said sensing element, and a movable variable cross section rod-shaped core members insertable into said central annular bore of said tubular support member and movable in relation to said armature member for varying the magnetic flux in accordance with the distance said movable rod-shaped core member is moved relative to said stationary annular magnetic armature member.

2. The analog distance sensor, according to claim 1, when said sensing element which is sensitive to the magnetic field is a Hall effect sensor.

3. The analog distance sensor, according to claim 1, wherein a permanent magnet is said stationary annular armature member.

4. The analog distance sensor, according to claim 1, wherein said stationary annular armature member includes a permanent magnet.

5. The analog distance sensor, according to claim 1, wherein said movable rod-shaped core member has a conical shape.

6. The analog distance sensor, according to claim 1, wherein said movable rod-shaped core member includes a flat surface.

7. The analog distance sensor, according to claim 1, wherein said movable rod-shaped core member includes a wedge-shaped recess.

8. The analog distance sensor, according to claim 6, wherein said movable rod-shaped core member is moved axially in relation to said stationary annular magnetic armature member for short-circuiting the lines of flux through said movable rod-shaped core member.

9. The analog distance sensor, according to claim 7, wherein said movable rod-shaped core member is moved angularly in relation to said stationary annular magnetic armature member for short-circuiting the lines of flux through said movable rod-shaped core member.

10. The analog distance sensor, according to claim 1, wherein said movable rod-shaped core member is concentrically disposed within said annular bore of said tubular support member.

* * * * *

UNITED STATES PATENT AND TRADEMARK OFFICE
CERTIFICATE OF CORRECTION

PATENT NO. : 4,665,362
DATED : May 12, 1987
INVENTOR(S) : Joachim Abel et al

It is certified that error appears in the above-identified patent and that said Letters Patent are hereby corrected as shown below:

Column 4, Claim 1, line 5, delete "rim" and insert --rims--

Claim 8, line 39, delete "magnetic"

Claim 9, line 44, delete "magnetic"

Signed and Sealed this

Twenty-second Day of September, 1987

Attest:

DONALD J. QUIGG

Attesting Officer   Commissioner of Patents and Trademarks